UNITED STATES PATENT OFFICE.

STANISLAW KALAMAIKOWSKI, OF NEW YORK, N. Y.

FIREPROOFING LIQUID.

SPECIFICATION forming part of Letters Patent No. 568,766, dated October 6, 1896.

Application filed April 23, 1896. Serial No. 588,792. (No specimens.)

*To all whom it may concern:*

Be it known that I, STANISLAW KALAMAIKOWSKI, a citizen of the United States, residing in the city, county, and State of New York, have invented new and useful Improvements in Fireproofing Liquids, of which the following is a specification.

My invention relates especially to that class of compositions employed for impregnating wood or any other porous or absorbent substance to render the same non-inflammable or fireproof, and has for its object the provision of a heating liquid inexpensive and easy to employ.

To attain the desired end, my invention consists in certain novel and useful combination of ingredients, hereinafter set forth and claimed, and combined in about the proportions specified: water, ten gallons; borax, four pounds; boracic acid, three pounds four ounces; sulfate of ammonia, four pounds five ounces; muriate of ammonia, four pounds five ounces; cream of tartar, seven and one-half ounces.

In preparing this compound hot water is employed and the ingredients added thereto and dissolved therein in the order named.

In rendering wood or other material fireproof with this liquid the material is saturated and impregnated therewith in any of the well-known methods and after drying is ready for use.

What I claim, and desire to secure by Letters Patent, is—

The herein-described fireproofing liquid consisting of water, borax, boracic acid, sulfate of ammonia, muriate of ammonia and cream of tartar in about the proportions specified.

STANISLAW KALAMAIKOWSKI.

Witnesses:
   HENRY BUNCE,
   LOUIS BERGER.